United States Patent [19]

Tischler

[11] Patent Number: 5,418,672
[45] Date of Patent: May 23, 1995

[54] BREAKAWAY TAB AND PLUG FOR SINGLE REEL CARTRIDGES

[75] Inventor: Charles M. Tischler, St. Paul, Minn.

[73] Assignee: Minnesota Mining and Manufacturing Company, St. Paul, Minn.

[21] Appl. No.: 892,229

[22] Filed: Jun. 2, 1992

[51] Int. Cl.⁶ ............................................. G11B 23/02
[52] U.S. Cl. ...................................... 360/132; 360/60
[58] Field of Search ......................... 360/132, 133, 60

[56] References Cited

U.S. PATENT DOCUMENTS

| | | | |
|---|---|---|---|
| 3,721,772 | 3/1973 | Miura et al. | 360/132 |
| 4,044,386 | 8/1977 | Satou et al. | 360/132 |
| 4,507,692 | 3/1985 | Sasaki | 360/60 |
| 4,571,654 | 2/1986 | Oishi | 360/132 |
| 4,665,456 | 5/1987 | Ahlberg et al. | 360/132 |
| 4,811,150 | 3/1989 | Sciggs et al. | 360/132 |
| 5,087,998 | 2/1992 | Oishi | 360/132 |
| 5,097,377 | 3/1992 | Hardisky | 360/132 |
| 5,121,279 | 6/1992 | Saeki et al. | 360/132 |

Primary Examiner—Thomas E. Denion
Attorney, Agent, or Firm—Gary L. Griswold; Walter N. Kirn; Charles D. Levine

[57] ABSTRACT

An erasure preventing device is located in the front wall of a cartridge which has an opening which is interactable with a cartridge drive system. A tab is irreplaceably removable from the front wall. When the tab is in place it blocks the opening and permits erasure, and when the tab is removed the opening is unblocked and prevents erasure. A removable, replaceable plug is insertable into the opening. When the plug is inserted in the opening it blocks the opening to permit erasure regardless of the presence of the tab. When the plug is removed from the opening it unblocks the opening.

6 Claims, 2 Drawing Sheets

BREAKAWAY TAB AND PLUG FOR SINGLE REEL CARTRIDGES

TECHNICAL FIELD

The present invention relates to tape cartridge erasure preventing devices for use in single reel cartridges. More particularly, the present invention relates to erasure preventing devices for blocking or unblocking an opening in a wall of the cassette to enable a mechanism of the recorder to sense the status of the cassette.

BACKGROUND OF THE INVENTION

Single reel data tape cartridges, one generation of which is known as 3480 type cartridges, include a reel containing magnetic tape with a leader block attached to the free end of the tape as it extends from the reel. The cartridge is generally rectangular except for one corner which is angled and includes a leader block window. The leader block window holds the leader block and permits the tape to exit from the cartridge for threading through a tape drive when the leader block is removed. When the leader block is snapped into the window, the window is covered.

The leader block is generally rectangular and has a cutout which combines with a pin to hold the tape. The front surface of the leader block includes a slot for engaging an automatic threading apparatus in a reel-to-reel magnetic tape drive apparatus. The front surface of the leader block is generally cylindrical and has a rounded boss which engages with an inclined surface of the corner of the cartridge. The rear surface is rounded to form a portion of an arc of a radius to match the periphery of the take-up reel hub in the tape drive apparatus as the leader block fits into the slot in the hub. A compliant section may be formed on the leader block to permit the leader block to compress at its rear surface to accommodate especially the first layer of tape when the tape is wound onto the take-up reel.

The tape drive apparatus includes a threading apparatus for connection to a single reel tape cartridge. The drive apparatus includes a drive motor for the supply reel mounted beneath a base plate so that its shaft extends normal to and slightly above a surface of the base plate. A take-up reel is mounted on the base plate and is attached to the motor. The cartridge reel, when coupled to the motor, lies in substantially the same plane as a hub of the take-up reel so that the tape moves in a plane normal to both motor shafts when being transported. After the threading of the tape, transfer of the tape between the supply reel and the take-up reel is achieved by controlling the driving motors for the reels. The tape passes a roller guide, an air bearing guide, a magnetic transducer head, a second air bearing guide, and a roller of a tension transducer.

The tape drive apparatus also includes a mechanism which interacts with the tape cartridge to sense whether the tape can be erased and recorded over or whether the tape is write-protected. Typical erasure preventing devices for these single reel cartridges incorporate a mechanism that blocks a record opening in a wall of the cassette when the tape can be erased and rotates to unblock the record opening when the tape cannot be erased. When the opening is unblocked, the tape drive apparatus mechanism disables the recording function to prevent accidental erasure.

Write protect mechanisms for other tape cartridges include a tab which covers a record opening to permit recording. The tab can be permanently removed to unblock the record opening and prevent recording and erasure. Some 10.5 inch computer tape reels, which cannot use a removable tab system, use a removable and replaceable annular ring which is placed within a complementary annular groove. However, these annular rings cannot be used with tape cartridges.

SUMMARY OF THE INVENTION

A single reel data tape cartridge according to the present invention includes a reel of magnetic tape with a leader block attached to the free end of the tape extending from the reel. The tape cartridge is used within a tape drive apparatus which includes a mechanism which interacts with the tape cartridge to sense whether the tape can be erased and recorded over or whether the tape is write-protected. The front wall has a record opening which interacts with the cartridge drive system. An erasure preventing device blocks the record opening in a wall of the cartridge when the tape can be erased and unblocks the record opening when the tape cannot be erased. When the opening is unblocked, the tape drive apparatus mechanism disables the recording function to prevent accidental erasure.

The erasure preventing device includes a tab which is molded integrally as one piece with the front wall and is irreplaceably removable from the front wall. When the tab is in place it blocks the opening and when the tab is removed the opening is unblocked. A removable, replaceable plug is insertable into the opening. When the plug is inserted in the opening it blocks the opening to permit data on the cartridge to be erased regardless of the presence of the tab. When the plug is removed from the opening it unblocks the opening to prevent the data from being erased.

The plug includes an upper base portion having a rectangular removal slot along one edge of the base portion. The slot can receive a small tool which can be used to pry the plug out of the opening to convert the cartridge from the write permitted mode to the write protected mode. Two legs extend from the base portion into the opening in the front wall of the cartridge when the plug is inserted into the opening. Each leg extends along the entire respective side of the base portion. The cross section of the legs is beveled and the legs decrease in thickness in a direction away from the base portion. The legs are biased outwardly. Inserting a plug into the opening after the erasure preventing tab has been removed returns the cartridge to a write condition and permits the cartridge to be reused to record data.

DETAILED DESCRIPTION OF PREFERRED EMBODIMENTS

Figure 1:
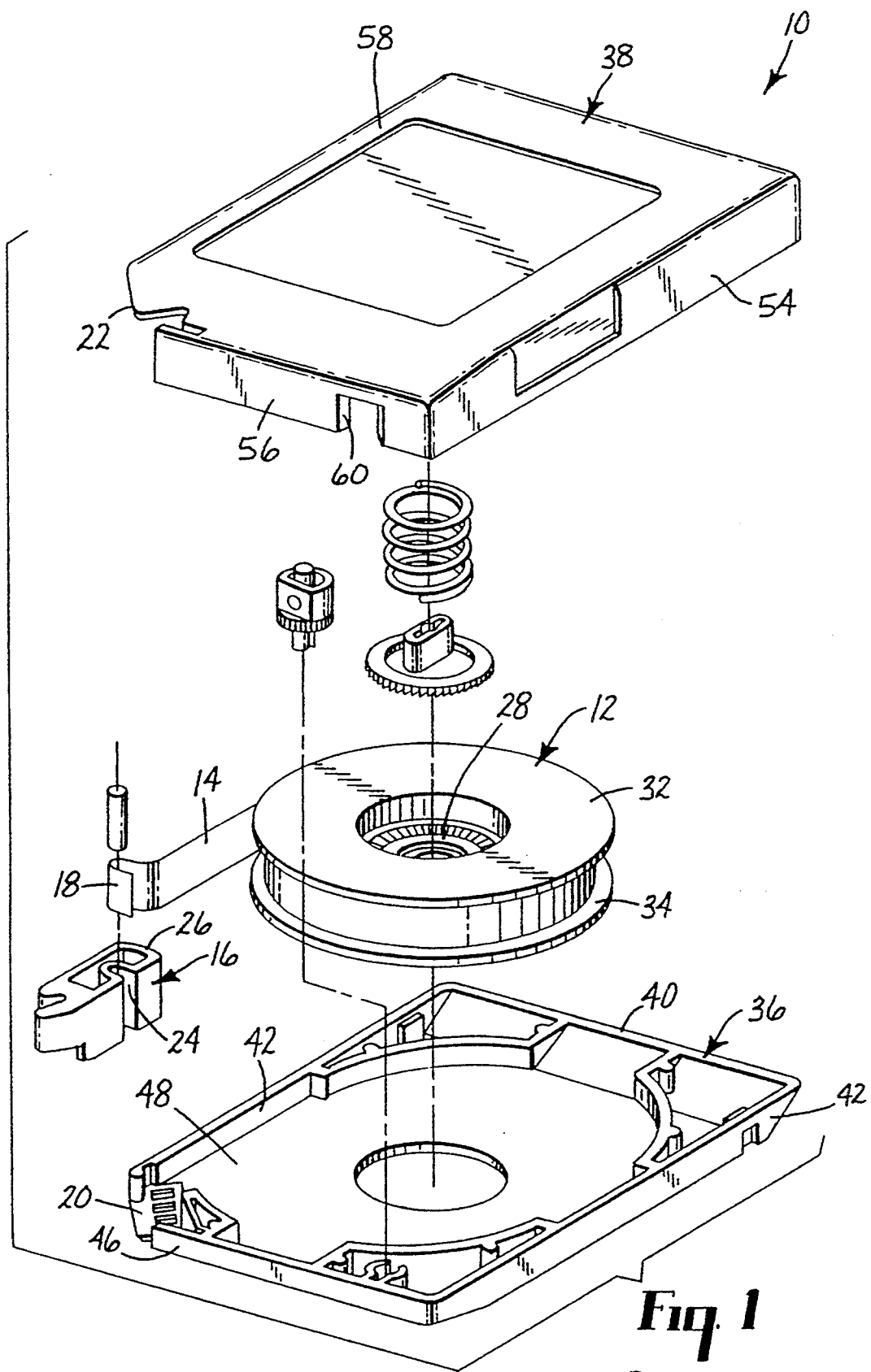
FIG. 1 is an exploded perspective view of a known single reel cartridge.

A single reel data tape cartridge 10, such as a 3480 type tape cartridge shown in FIG. 1, includes a tape reel 12 containing magnetic tape 14. A leader block 16 is attached to the free end 18 of the tape 14 that extends from the reel 12. The cartridge 10 is generally rectangular except for one corner 20 which is angled and includes a leader block window 22. The leader block window 22 holds the leader block 16 and is an opening for the tape 14 to exit from the cartridge 10 for threading through a tape drive when the leader block 16 is removed. When the leader block 16 is snapped into the window 22, the window 22 is covered.

The front surface of the leader block 16 includes a slot 24 for engaging an automatic threading apparatus of a reel-to-reel magnetic tape drive apparatus. The front surface also engages an inclined surface of the corner of the cartridge. The rear surface is rounded 26 to form a portion of an arc of a radius to match the periphery of the take-up reel hub in the tape drive apparatus as the leader block 16 fits into the slot in the hub. A compliant section may be formed on the leader block 16 to permit the leader block 16 to compress at its rear surface to accommodate especially the first layer of tape 14 when the tape 14 is wound onto the take-up reel. The tape reel 12 includes a cylindrical hub 28 having a cylindrical tape winding surface, an upper flange 32 mounted on one axial end of the hub, and a lower flange 34 mounted on the other axial end of the hub.

The cartridge 10 is formed of a base 36 and a cover 38 which combine to form a housing. The base 36 includes a rear wall 40, two opposing side walls 42, a front wall 46, and a lower wall 48 connecting the rear, front, and side walls. The cover 38 includes a rear wall, two opposing side walls 54, a front wall 56, and an upper wall 58 connecting the rear, front, and side walls. The lower wall 48 and the upper wall 58 are the major walls of the housing.

The tape drive apparatus includes a mechanism which interacts with the tape cartridge 10 to sense whether the tape 14 can be erased and recorded over or whether the tape is write-protected. The front wall 46, 56 of the cartridge has a record opening 60 which is interactable with the cartridge drive system. An erasure preventing device is locatable in the record opening 60. When the erasure preventing device blocks the record opening 60, the tape 14 can be erased. When the erasure preventing device unblocks the record opening 60, the tape drive apparatus mechanism disables the recording function to prevent accidental erasure and the tape 14 cannot be erased.

Figure 2:
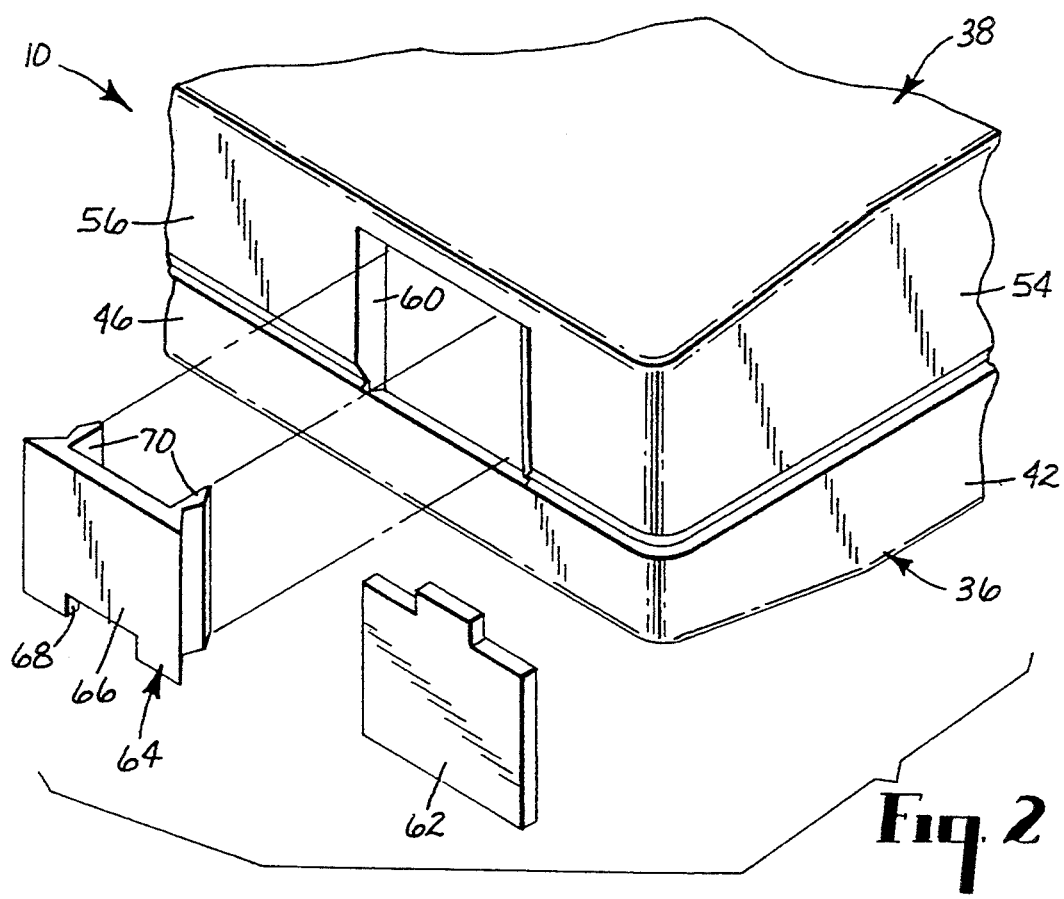
FIG. 2 is a perspective view of a portion of a single reel cartridge according to the present invention.
Figure 3:
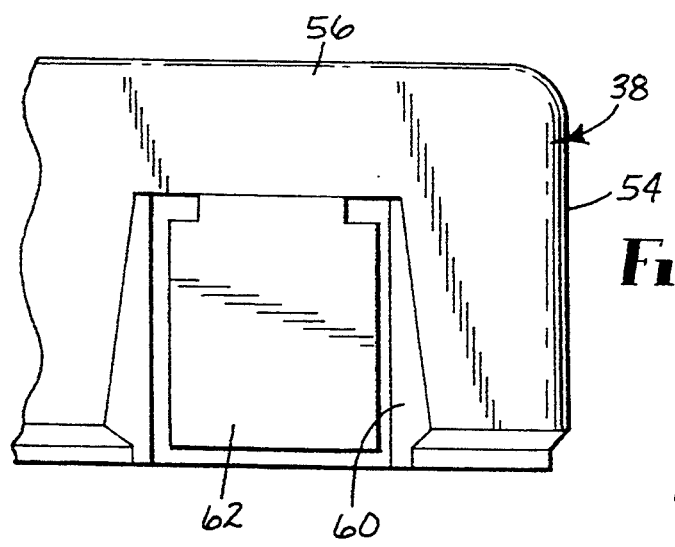
FIG. 3 is a front view of the tab of the erasure preventing device of the cartridge of FIG. 2.

The erasure preventing device of the present invention includes a tab 62, shown in FIGS. 2 and 3, which is molded integrally as one piece with the front wall 56 of the cover 38 and is irreplaceably removable from the front wall. When the tab 62 is in place it blocks the opening 60 and when the tab 62 is removed the opening 60 is unblocked.

A removable, replaceable plug 64 is insertable into the opening 60. When the plug 64 is inserted in the opening 60 it blocks the opening 60 to permit data on the tape 14 to be erased regardless of the presence of the tab 62. When the plug 64 is removed from the opening 60 it unblocks the opening to prevent the data on the tape 14 from being erased. The plug 64 can be repeatedly removed from and replaced in the opening 60.

Figure 4:
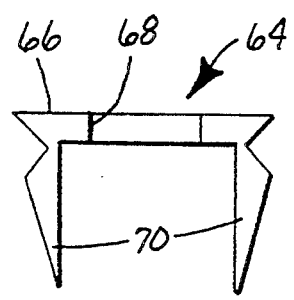
FIG. 4 is a cross-sectional view of the plug of the erasure preventing device of the cartridge taken along line 4—4 of FIG. 2.

The plug 64 includes an upper base portion 66 which, when the plug 64 is inserted into the opening 60, is substantially flush with the front wall 46, 56 of the cartridge 10. A rectangular removal slot 68 is formed in the base portion 66 along one edge of the base portion 66. The slot 68 can receive a small tool which can be used to pry the plug 64 out of the opening 60 to convert the cartridge 10 from the write permitted mode to the write protected mode. Two legs 70 extend from the base portion 66 into the opening 60 when the plug 64 is inserted into the opening 60. As shown, each leg 70 extends along the entire respective side of the base portion 66, although the legs 70 need not be so wide. As shown in FIG. 4, the cross-sectional area of the legs 70 decreases in a direction away from the base portion 66. The legs 70 are biased outwardly.

The plug 64 is snapped into place in the opening 60 using the biased, beveled legs. These legs 70 provide a side force which prevents the plug 64 from falling out of the opening 60 or moving around within the opening 60. The plug 64 is removed from the opening 60 using any common tool, such as a screwdriver, pen, pencil, or knife, which is inserted in the rectangular removal slot 68 in the plug 64 and pulled toward the side of the plug 64 without the removal slot 68. Several plugs 64 can be packaged with a single cartridge 10 for later use in the event a plug 64 is misplaced. As the plugs 84 can be used with all similar single reel data tape cartridges 10, plugs from other cartridges can be used.

Inserting a plug 64 into the opening 60 after the erasure preventing tab 62 has been removed returns the cartridge 10 to a write condition and permits the cartridge 10 to be reused to record data. The tab 62 and plug 64 can be a contrasting color with that of the remainder of the cartridge 10 to permit easy visual detection of cartridges on which data can be written.

Alternatively, the plug 64 could be inserted in the opening 60 when the cartridge 10 is manufactured to serve as the entire erasure preventing system. No tab 62 molded with the front wall is required.

Numerous characteristics, advantages, and embodiments of the invention have been described in detail in the foregoing description with reference to the accompanying drawings. However, the disclosure is illustrative only and the invention is not intended to be limited to the precise embodiments illustrated. Various changes and modifications may be effected therein by one skilled in the art without departing from the scope or spirit of the invention.

I claim:

1. An erasure preventing device for single reel tape cartridges wherein the cartridge includes a wall having an opening which is interactable with the cartridge drive system such that when the opening is blocked data on the cartridge can be erased and when the opening is unblocked the data on the cartridge can not be erased, wherein the erasure preventing device comprises:

a removable, replaceable plug which blocks the opening when inserted in the opening to permit data on the cartridge to be erased, which is not movable within the opening while it is in the opening, and which unblocks the opening when removed from the opening to prevent the data on the cartridge from being erased, wherein the plug comprises an upper base portion which is substantially flush with the wall of the cartridge when the plug is inserted into the opening; and two legs extending from respective sides of the base portion which extend into the opening in the wall of the cartridge when the plug is inserted into the opening, wherein each leg extends along the entire respective side of the base portion wherein the cross-sectional area of the legs decreases in a direction away from the base portion for at least half of the length of the legs and the legs are biased outwardly, and wherein the legs provide a side force which holds the plug within the opening without moving within the opening.

2. The erasure preventing device of claim 1 further comprising a tab which is molded integrally as one piece with the wall and is irreplaceably removable from the wall, wherein when the tab is in place it blocks the opening and when the tab is removed the opening is unblocked; wherein when the removable, replaceable plug is inserted in the opening it blocks the opening to permit data on the cartridge to be erased regardless of the presence of the tab, and when the removable, replaceable plug is removed from the opening it unblocks the opening to prevent the data on the cartridge from being erased when the tab is not present.

3. The erasure preventing device of claim 1 wherein the base portion includes a rectangular removal slot formed along one edge of the base portion, wherein the slot can receive a small tool which can be used to pry the plug out of the opening to convert the cartridge from the write permitted mode to the write protected mode.

4. The erasure preventing device of claim 1 wherein the tape cartridge is a 3480-type single reel data tape cartridge.

5. An erasure preventing device for single reel tape cartridges wherein the cartridge includes a wall having an opening which is interactable with the cartridge drive system such that when the opening is blocked data on the cartridge can be erased and when the opening is unblocked the data on the cartridge can not be erased, wherein the erasure preventing device comprises:

a tab which is molded integrally as one piece with the wall and is irreplaceably removable from the wall, wherein when the tab is in place it blocks the opening and when the tab is removed the opening is unblocked; and a removable, replaceable plug which blocks the opening when inserted in the opening to permit data on the cartridge to be erased regardless of the presence of the tab, which is not movable within the opening while it is in the opening, and which unblocks the opening when removed from the opening to prevent the data on the cartridge from being erased when the tab is present, wherein the plug comprises an upper base portion which, is substantially flush with the wall of the cartridge when the plug is inserted into the opening; and two legs extending from respective sides of the base portion which extend into the opening in the wall of the cartridge when the plug is inserted into the opening, wherein each leg extends along the entire respective side of the base portion, wherein the cross section of the legs is beveled and the legs decrease in thickness in a direction away from the base portion for at least half of the length of the legs and the legs are biased outwardly, and wherein the legs provide a side force which holds the plug within the opening without moving within the opening.

6. The erasure preventing device of claim 5 wherein the base portion includes a rectangular removal slot formed along one edge of the base portion, wherein the slot can receive a small tool which can be used to pry the plug out of the opening to convert the cartridge from the write permitted mode to the write protected mode.

* * * * *